3,313,864
PROCESS FOR THE STEPWISE PRODUCTION OF MOULDED ARTICLES FROM MOULDING MASSES BASED ON UNSATURATED POLYESTERS AND COPOLYMERISABLE MONOMERIC COMPOUNDS
Hans Rudolph and Karl-Heinz Rullmann, Krefeld-Bockum, Hermann Schnell, Krefeld-Urdingen, and Klaus Prater and Karl Raichle, Krefeld-Bockum, Germany, assignors to Farbenfabriken Bayer Aktiengesellschaft, Leverkusen, Germany, a corporation of Germany
No Drawing. Filed July 6, 1965, Ser. No. 469,844
Claims priority, application Germany, Aug. 12, 1964, F 43,726
13 Claims. (Cl. 260—864)

It is known that moulding masses of unsaturated polyesters and copolymerizable monomers can first be converted at moderate temperatures by partial polymerization into prepolymers which can later be converted as and when required into moulded articles by final hardening in the hot and under pressure if necessary. Such pre-polymers frequently offer advantages over the non-prepolymerized moulding masses. They are suitable, e.g. as solid or semi-solid masses, for various possibilities of working up; their polymerization shrinkage is, moreover, substantially prevented.

It is especially advantageous to add to the polyester moulding masses, besides the peroxide polymerization catalysts which bring about the final hardening only at an elevated temperature, e.g. tert-butyl perbenzoate, dicumyl peroxide, butyl cumyl peroxide, benzoyl peroxide, etc., also so-called "gellers" which cause the moulding masses to gel already at room or moderately elevated temperature.

Known gellers are e.g. boron trifluoride, sulphuric acid, phosphorus pentoxide, halides of elements of Groups 3–5 of the Periodic Table, e.g. stannous chloride, possibly in admixture with mercaptans, furthermore, alkyl metal and Grignard compounds, as well as mixtures of amine salts and mertcaptans, e.g. trimethyl benzylamine hydrochloride and dodecyl mercaptan, finally also strong reducing agents, such as e.g. ascorbic acid. Fairly large amounts of these mentioned compounds must usually be added, which naturally has a disadvantageous effect on the water resistance of the moulded articles later obtained.

The object of the present invention is a process for the stepwise production of moulded articles from moulding masses based on unsaturated polyesters and copolymerizable monomeric compounds with a content of polymerization catalysts and gellers, by applying different elevated temperatures, which is characterized in that as gellers there are used compounds of the formula

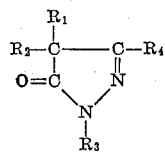

in which $R_1$ and $R_2$ signify hydrogen or alkyl radicals, $R_3$ signifies aryl radicals, and $R_4$ signifies alkyl radicals.

As a rule, amounts of these gellers of about 0.001– about 0.01 percent by weight, referred to the moulding masses, suffice.

In comparison with the masses mixed with known gellers, such masses are characterized, in particular, in that they give moulded parts with exceptionally high water resistance. Furthermore, it is to be emphasized that the prepolymers obtained with the use of such masses prossess a sufficient storage stability for practical requirements.

As examples of the compounds to be used according to the invention as gellers, there may be mentioned:
1 - phenyl-3-methyl-pyrazolone-(5), 1 - phenyl-3-(carboxy-allyl)-pyrazolone-(5), 1 - phenyl-3-methyl-4-ethyl-pyrazolone-(5), 1 - phenyl-3-methyl-4,4 - diethyl-pyrazolone-(5), 1 - (2-chlorophenyl)-3-methyl-pyrazolone-(5) and 1-(4-methylphenyl)-3-methyl-pyrazolone-(5).

Polymerization catalysts for the final hardening are the known peroxides, preferably the more stable types, such as dicumyl peroxide, di-tert.-butyl peroxide, tert.-butyl cumyl peroxide, tert.-butyl perbenzoate, tert.-butyl peracetate, 2,2-bis-(tert.-butyl-peroxy)-butane, benzoyl peroxide, lauroyl peroxide etc.

Especially suitable polymerization catalysts because they are especially stable are ethane derivatives of the formula

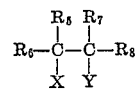

in which $R_5$ and $R_7$ signify aromatic radicals, especially phenyl radicals, $R_6$ signifies hydrogen or an aliphatic or aromatic radical, especially a phenyl radical, $R_8$ signifies an aliphatic or aromatic radical, especially a phenyl radical, and X and Y signify a possibly blocked hydroxy group and/or a possibly substituted $NH_2$ group and/or halogen.

Typical representatives of the ethane derivatives to be used according to the invention as catalysts are benzpinacone and its nuclear substitution products; as further compounds belonging to this class of compounds there may be mentioned: benzpinacone mono- and dialkyl ethers, benzpinacone mono- and diphenyl ethers, the cyclic carbonate of benzpinacone and benzpinacone dibenzoate, furthermore, acetophenone-pinacone and its cyclic sulphite, xanthone-pinacone and fluorenone-pinacone, also 1,2-di-(3-pyridyl)-1,2-diphenyl-ethane-1,2 - diol, 1,2- dichloro-tetraphenyl-ethane, triphenyl glycol and triphenyl-ethanolamine.

These catalysts are especially suitable not only because they do not possess the known deficiences of the peroxides, such as ready inflammability, explosiveness and allergic irritability, but because their greater stability at room and moderately elevated temperature permits also the production of masses with especially high storage stability.

Unsaturated polyesters in the meaning of the invention are, as usual, condensation products of $\alpha,\beta$-ethylenically unsaturated dicarboxylic acids, such as maleic acid, fumaric acid, itaconic acid, mesaconic acid, and citraconic acid, with polyalcohols, such as ethylene glycol, diethylene glycol, neopentyl glycol, propane-, butane- and hexane-diols, trimethylol-propane and pentaerythritol, which may also contain radicals of other dicarboxylic acids, e.g. phthalic acid, tetrachlorophthalic acid, terephthalic acid, adipic acid and the like, as well as of monofunctional alcohols, such as butanol, tetrahydrofurfuryl alcohol and ethylene glycol monobutyl ether, as well as of monobasic acids, such as benzoic acid, oleic acid, linseed oil fatty acid and dehydrated castor oil fatty acid.

Suitable monomeric unsaturated compounds which can be copolymerized with the unsaturated polyesters are e.g. vinyl compounds, such as styrene, vinyl-toluene and divinyl-benzene, furthermore, vinyl esters, such as vinyl acetate, and also unsaturated carboxylic acids and their derivatives, such as (meth)acrylic acid ester and nitrile, furthermore, allyl esters, such as allyl acetate, allyl acrylate, phthalic acid diallyl ester, triallyl phosphate and triallyl cyanurate.

There may also be mentioned mixtures of unsaturated polyesters with monomeric unsaturated compounds which, apart from the radicals of $\alpha,\beta$-unsaturated dicarboxylic acids, also contain $\beta,\gamma$-unsaturated ether radicals, either also as component of the polyesters, e.g. according to British patent specification No. 810,222, or as component of other mixture components, e.g. according to British patent specification No. 848,400 and British patent specification No. 887,957, which, besides their copolymerizability, are also air-drying.

As inhibitors, there may be added known additives, e.g. p-benzoquinone, 2,5-di-tert.-butyl-quinone, hydroquinone, tert.-butyl-pyrocatechol and 4-ethyl-pyrocatechol, furthermore, copper compounds and hydroxylamine derivatives.

Besides catalysts, gellers and inhibitors, the moulding masses can contain all other technically known additives, e.g. magnesium oxide, chalk, slate powder, dolomite, barite, talc, zinc stearate, dyestuffs, fabrics and fibres of glass, synthetic resin or textile products, compounds which give protection against light, heat or burning, etc. It is advantageous to added these materials before or during the pre-polymerization.

The pre-polymerization according to the invention is expediently carried out at room or moderately elevated temperature in stirring devices, kneaders, worms or rolling apparatus. A successful course of the process is only ensured if the pre-polymerization takes place up to the gel stage in a temperature range in which the admixed polymerization catalysts do not bring about the final hardening.

An expedient control of the temperature can be ascertained by simple preliminary experiments. The transition into the gel state manifests itself—even in the case of highly filled masses—in a characteristic, readily recognizable alteration of consistency.

The pre-polymers can be hardened in the hot, for example, as friable moulding masses, in the usual manner, while moulding, even after fairly prolonged storage times.

Further details are to be gathered from the following examples. The parts given therein are parts by weight.

EXAMPLE 1

An unsaturated polyester, produced by the condensation of 966 parts of maleic anhydride, 845 parts of phthalic anhydride, 894 parts of neopentyl glycol, 307 parts of butane-1,3-diol, 139 parts of propane-1,2-diol and 150 parts of ethylene glycol, is dissolved in styrene as a 61.5% solution.

A mixture of 500 parts of the so obtained mass is treated under nitrogen at 70° C. in a kneader with 1000 parts of dolomite, 20 parts of zinc stearate, 10 parts of magnesium oxide, 10 parts of benzoyl peroxide paste (50% benzoyl peroxide solution in a plasticiser) and 0.5 part of a 5% solution of 1-phenyl-3-methyl-pyrazolone-(5) in styrene. After 11 minutes, gelling takes place, whereby the originally viscous mixture solidifies. After cooling to room temperature, the pre-polymerizate obtained is comminuted in a cross beater mill to a particle size of 3–4 mm.

280 parts of the so obtained friable and storable mass are moulded in a standard device (DIN 53,470, for the production of standard rods) at 145° C. and a pressure of 30 metric tons for 4 minutes. The standard rods possess the following properties:

Marten's degree _____ 120
Bending strength _____kp./cm.$^2$__ 220
Impact bend strength _____cm. kp./cm.$^2$__ 1.2
Water absorption (DIN 53,472) _____mg__ 40

If, instead of the pyrazolone, there is used a combination of stannous chloride and mercaptan for the gelling, the procedure otherwise being precisely as previously described, then an 80% higher water absorption is obtained the results being otherwise practically the same.

EXAMPLE 2

An unsaturated polyester, produced by the condensation of 1720 parts of maleic anhydride, 660 parts of phthalic anhydride, 590 parts of ethylene glycol and 1188 parts of butane-1,3-diol, is dissolved in styrene to give a 65% solution.

A mixture of 500 parts of this moulding mass is kneaded under nitrogen at 70° C., until gelled (duration about 15 minutes), with 1500 parts of dolomite, 20 parts of zinc stearate, 10 parts of magnesium oxide, 10 parts of tert.-butyl perbenzoate (95%) and 0.5 part of a 5% solution of 1-phenyl-3-methyl-pyrazolone-(5) in styrene, cooled and comminuted.

The standard rods obtained by moulding this pre-polymer for 4 minutes (145° C., 30 metric tons) in a standard device, have the following properties:

Marten's degree _____ 170
Bending strength _____kp./cm.$^2$__ 320
Impact bend strength _____cm. kp./cm.$^2$__ 1.4
Water absorption (DIN 53,472) _____mg__ 170

Moulding of the pre-polymer repeated after three months' storage, provides moulded articles with unaltered properties.

EXAMPLE 3

An unsaturated polyester, produced by the condensation of 1961 parts of maleic anhydride and 1674 parts of propane-1,2-diol, is dissolved in styrene to give a 65% solution.

500 parts of the so obtained moulding mass are treated at 60° C. under nitrogen in a kneader, together with 1000 parts of dolomite, 20 parts of zinc stearate, 20 parts of benzpinacone, 10 parts of magnesium oxide and 0.5 part of a 5% solution of 1-phenyl-3-methyl-pyrazolone-(5) in styrene. After about 15 minutes, gelling takes place, whereby the originally viscous mixture solidifies. After cooling to room temperature, the pre-polymer obtained is comminuted to a particle size of 3–4 mm. diameter in a cross beater mill.

280 parts of the so obtained friable mass are moulded in a standard device (DIN 53,470, for the production of standard rods) at 145° C. and a pressure of 30 metric tons for 4 minutes. The standard rods obtained possess the following properties:

Marten's degree _____ 137
Bending strength _____kp./cm.$^2$__ 420
Impact bend strength _____cm. kp./cm.$^2$__ 2.5
Water absorption (DIN 53,472) _____mg__ 170

Moulding of the pre-polymer repeated after 2½ month's storage provides unaltered properties.

A pre-polymer produced with the use of 0.5 parts by weight ascorbic acid (dissolved 1:3 in dimethyl formamide) as geller, but otherwise under the same conditions, yields standard rods with a 50% greater water absorption while working up is the same.

EXAMPLE 4

An unsaturated polyester, produced by the condensation of 1720 parts of maleic anhydride, 660 parts of phthalic anhydride, 590 parts of ethylene glycol and 1188 parts of butane-1,3-diol, is dissolved in styrene as a 65% solution.

500 parts of this moulding mass are kneaded at 60° C. under nitrogen until gelled, together with 1000 parts of dolomite, 100 parts of glass fibre, 20 parts of zinc stearate, 10 parts of magnesium oxide, 10 parts of benzpinacone and 0.5 parts of a 5% solution of 1-phenyl-3-methyl-pyrazolone-(5) in styrene, cooled and comminuted.

The standard rods obtained by moulding the pre-polymer (145° C., 30 metric tons) in standard devices possess a water absorption of 60 mg. (DIN 53,472).

A pre-polymer produced with the use of 0.5 parts by weight ascorbic acid (dissolved 1:3 in dimethyl formamide) as geller, instead of the pyrazolone, but otherwise under the same conditions, yields standard rods with a 50% higher water absorption, the method of working up being the same.

What we claim is:

1. In a process wherein an unsaturated polyester polymeric condensation reaction product of an α, β-unsaturated dicarboxylic acid and a polyalcohol is copolymerized with a vinyl monomer to form a pre-polymer gel suitable for moulding, the improvement comprising employing as a gelling catalyst in the polymerization system a compound of the formula

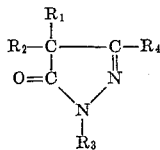

wherein $R_1$ and $R_2$ are each selected from the group consisting of hydrogen and an alkyl radical, $R_3$ is an aryl radical, and $R_4$ is an alkyl radical.

2. A process for the preparation of a pre-polymer suitable for moulding which comprises copolymerizing styrene with an unsaturated polyester prepared by the condensation of maleic anhydride, phthalic anhydride, neopentyl glycol, butane-1,3-diol, propane-1,2-diol, and ethylene glycol, said copolymerization being conducted in the presence of a peroxide catalyst and of 1-phenyl-3-methyl-pyrazolone-(5) as the geller.

3. In a process wherein styrene is copolymerized with an unsaturated polyester prepared by the condensation of maleic anhydride, phthalic anhydride, ethylene glycol, and butane-1,3-diol in the presence of a polymerization catalyst to form a prepolymer suitable for moulding; the improvement comprising employing as the geller 1-phenyl-3-methyl-pyrazolone-(5).

4. In a process wherein styrene is copolymerized with an unsaturated polyester of maleic anhydride and propane-1,2-diol in the presence of a polymerization catalyst to form a prepolymer suitable for moulding; the improvement comprising employing as the geller 1-phenyl-3-methyl-pyrazolone-(5).

5. In a process wherein an unsaturated polyester polymeric condensation reaction product of an α, β-unsaturated dicarboxylic acid and a polyalcohol is copolymerized with a copolymerizable monomeric compound to form a pre-polymer gel suitable for moulding, the improvement comprising employing, as a gelling catalyst, a compound of the formula:

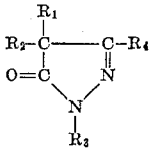

wherein $R_1$ and $R_2$ are each selected from the group consisting of hydrogen and an alkyl radical, $R_3$ is an aryl radical and $R_4$ is an alkyl radical.

6. The process of claim 5 wherein a peroxide catalyst is used as polymerization catalyst.

7. The process of claim 5 wherein a compound of the formula:

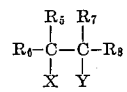

wherein $R_5$ and $R_7$ are aromatic radicals, $R_6$ is hydrogen or an aliphatic or aromatic radical, $R_8$ is an aliphatic or aromatic radical and X and Y are hydroxyl, blocked hydroxyl group, $NH_2$, a substituted $NH_2$-group or halogen, is used as catalyst.

8. A pre-polymer comprising a pre-polymerized moulding mass based on an unsaturated polyester polymeric condensation reaction product of an α,β-unsaturated dicarboxylic acid and a polyalcohol, a copolymerizable monomeric compound, a polymerization catalyst and, as a gelling catalyst, a compound of the formula:

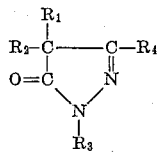

wherein $R_1$ and $R_2$ are each selected from the group consisting of hydrogen and an alkyl radical, $R_3$ is an aryl radical and $R_4$ is an alkyl radical.

9. The pre-polymer of claim 8 wherein said polymerization catalyst is a peroxide catalyst.

10. The pre-polymer of claim 8 wherein said polymerization catalyst is of the formula:

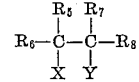

wherein $R_5$ and $R_7$ are aromatic radicals, $R_6$ is hydrogen or an aliphatic or aromatic radical, $R_8$ is an aliphatic or aromatic radical and X and Y are hydroxyl, a blocked hydroxyl group, $NH_2$, a substituted $NH_2$-group or halogen.

11. A pre-polymer comprising a pre-polymerized moulding mass based on an unsaturated polyester condensation product of maleic anhydride, phthalic anhydride, neopentyl glycol, butane-1,3-diol, propane-1,2-diol and ethylene glycol; styrene; a peroxide polymerization catalyst and, as gelling catalyst, 1-phenyl-3-methyl-pyrazolone-(5).

12. A pre-polymer comprising pre-polymerized moulding masses based on an unsaturated polyester condensation product of maleic anhydride, phthalic anhydride, ethylene glycol, and butane-1,3-diol; styrene; a polymerization catalyst and, as gelling catalyst, 1-phenyl-3-methyl-pyrazolone-(5).

13. A pre-polymer comprising a pre-polymerized moulding mass based on an unsaturated polyester condensation product of maleic anhydride and propane-1,2-diol; styrene; a polymerization catalyst and, as gelling catalyst, 1-phenyl-3-methyl-pyrazolone-(5).

References Cited by the Examiner
UNITED STATES PATENTS 3,146,216  8/1964  Salgado et al. _____ 260—863
3,221,081  11/1964  Sarradin _____ 260—864

MURRAY TILLMAN, Primary Examiner.

J. T. GOOLKASIAN, Assistant Examiner.